Figure 1:
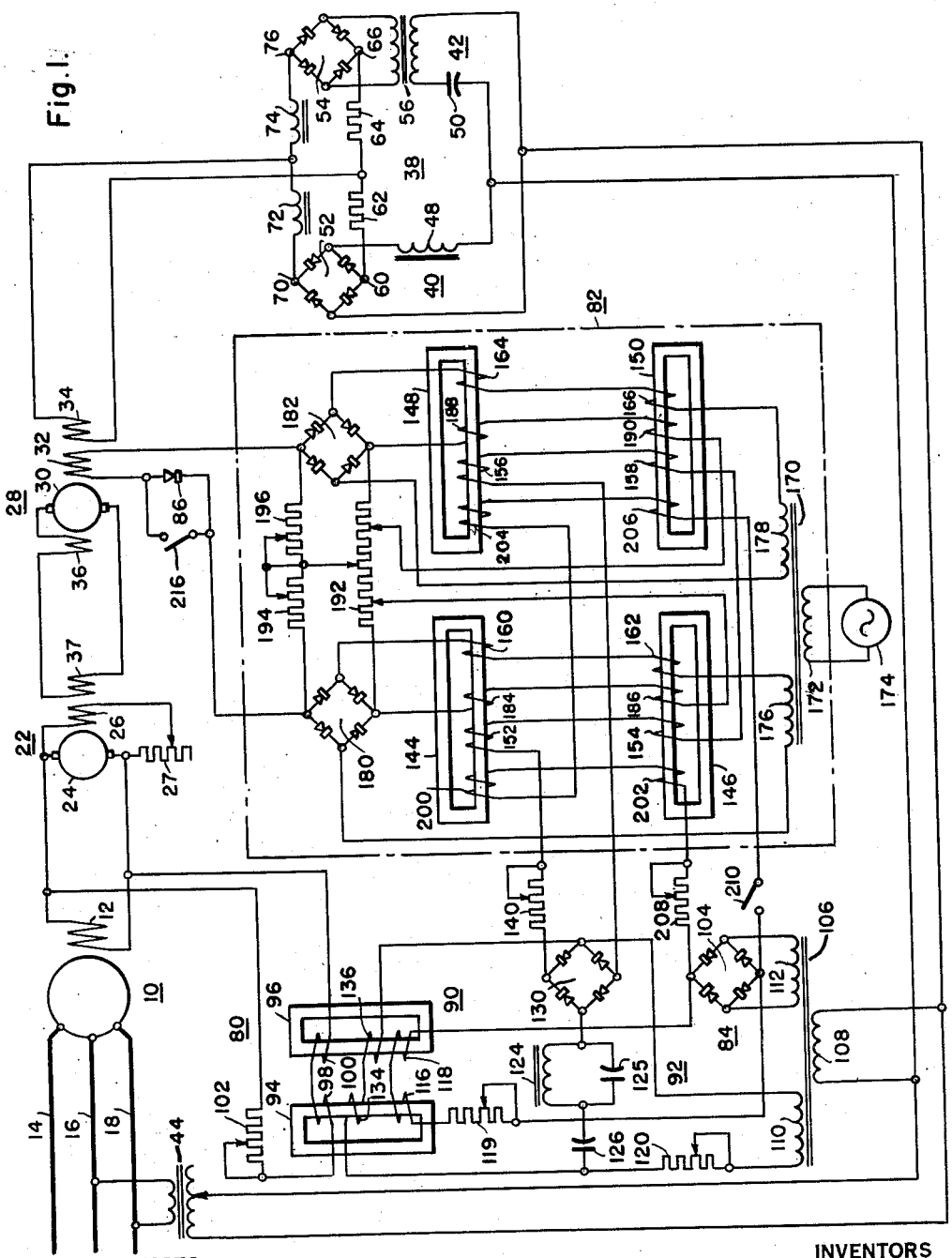

Jan. 19, 1954  S. L. BRADLEY ET AL  2,666,885
STATIC MINIMUM EXCITATION SYSTEM FOR ALTERNATORS
Filed Aug. 9, 1952  2 Sheets-Sheet 1

WITNESSES:

INVENTORS
Schuyler L. Bradley
and Neil Nichols.
BY
ATTORNEY

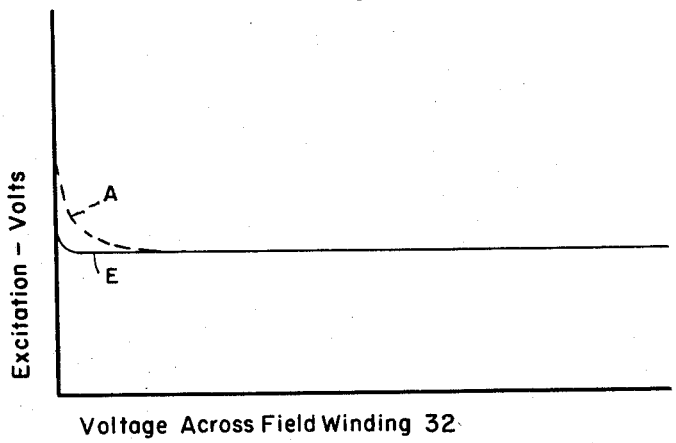
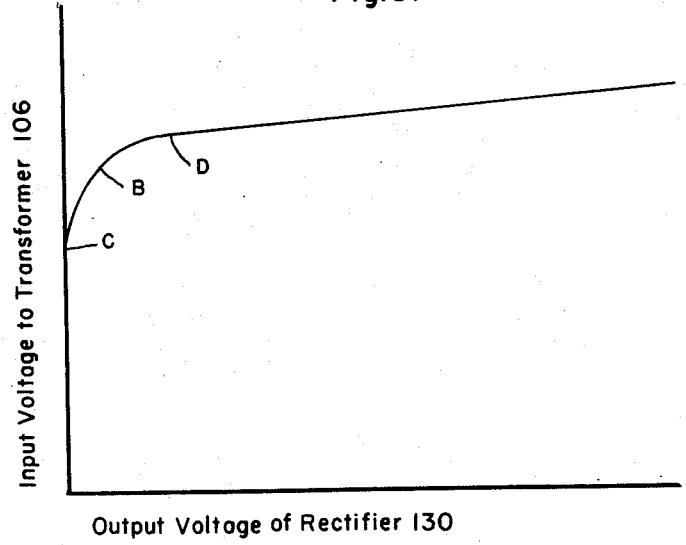

Patented Jan. 19, 1954

2,666,885

UNITED STATES PATENT OFFICE 2,666,885

STATIC MINIMUM EXCITATION SYSTEM FOR ALTERNATORS

Schuyler L. Bradley, Pittsburgh, Pa., and Neil Nichols, Southgate, Calif., assignors to Westinghouse Electric Corporation, East Pittsburgh, Pa., a corporation of Pennsylvania Application August 9, 1952, Serial No. 303,578

6 Claims. (Cl. 322—24)

This invention relates generally to regulating systems and more particularly to regulating systems incorporating means for preventing the excitation voltage of a regulated machine from decreasing below a predetermined value.

Heretofore many systems have been utilized for preventing the field excitation of a regulated machine from decreasing below a predetermined value. However, these prior art systems have many limitations. For instance, some of them do not respond to negative minimum excitation voltage settings and oftentimes the regulated voltage is affected by excitation changes over the normal range. In addition, in these prior art systems the intelligence portion of the circuit draws a large amount of energy from the potential source and requires a high level for the damping of the circuit. Further many of the circuits hereinbefore utilized have electronic tubes incorporated therein which require a considerable amount of maintenance. Also, these prior art systems are difficult to adjust and set accurately.

An object of this invention is to provide for so biasing a minimum excitation system for a regulated machine that the system is polarized causing it to respond to either positive or negative minimum excitation voltage settings.

Another object of this invention is to provide for preventing an output from a minimum excitation system until the minimum excitation level is reached, by utilizing an amplifier whose output is made unidirectional and then so biased as to have no output until the minimum excitation level is reached, whereby the regulated voltage is not affected by excitation changes over the normal range.

A further object of this invention is to provide for readily and accurately adjusting a minimum excitation system by properly disposing a magnetic amplifier in the system, the gain of which is readily adjustable.

A still further object of this invention is to provide for minimizing the amount of energy drawn from a potential transformer which supplies the voltage reference network and the minimum excitation system, by properly disposing a magnetic amplifier in the system.

Other objects of this invention will become apparent from the following description when taken in conjunction with the accompanying drawings, in which Figure 1 is a schematic diagram illustrating an embodiment of the teaching of this invention;

Fig. 2 is a graph illustrating the manner in which the excitation voltage of the regulated machine varies with changes in the voltage across the auxiliary control or field winding of the rotary amplifier incorporated within the system, and Fig. 3 is a graph illustrating the manner in which the output voltage of the sensing network incorporated in the minimum excitation system varies with its alternating current input voltage.

Referring to Fig. 1 of the drawing, there is illustrated an embodiment of the teaching of this invention in which a synchronous condenser 10, comprising a main field winding 12, is disposed to supply energy to load conductors 14, 16 and 18. In order to control the magnitude of the voltage across the field winding 12, a main exciter 22 is provided. In this instance, the main exciter 22 comprises an armature 24 which is electrically connected across the field winding 12 and a shunt field winding 26, the magnitude of the voltage across which is adjusted by means of a variable resistor 27.

For the purpose of controlling the output of the main exciter 22, a rotary amplifier 28 is provided. As illustrated, the rotary amplifier 28 comprises an armature 30, an auxiliary field or control winding 32, a main field or control winding 34, and a series field winding 36. Of course it is to be understood that any suitable magnetic amplifier or electronic amplifier could be substituted for the rotary amplifier 28 by one skilled in the regulator art, the particular amplifier used being responsive to the voltages that appear across the windings 32 and 34. In this instance, a field winding 37 is inductively coupled with the shunt field winding 26 of the main exciter 22 and it is responsive to the output of the rotary amplifier 28. In operation, the series field winding 36 supplies the majority of the excitation requirements for the rotary amplifier 28, the remainder of the excitation being supplied by the field winding 34 and the auxiliary field winding 32.

In order to maintain the output voltage of the synchronous condenser 10 substantially constant, a voltage reference network 38 is provided. The voltage reference network 38 comprises a non-linear impedance circuit 40 and a linear impedance circuit 42 connected to be simultaneously energized in accordance with the output voltage of the synchronous condenser 10. As illustrated, the circuits 40 and 42 are electrically connected to the load conductors 16 and 18 through a variable potential transformer 44. The non-linear impedance circuit 40 includes a saturating reactor 48, whereas the linear impedance circuit 42 includes a capacitor 50. The saturating reactor 48 and the capacitor 50 have intersecting impedance characteristics so that when the output voltage of the synchronous condenser 10 is above the regulated value, the saturating reactor 48 draws more current, and when it is below the regulated value the capacitor 50 draws more current.

The non-linear impedance circuit 40 is electrically connected across a dry type rectifier unit 52 and the linear impedance circuit 42 is connected across the dry type rectifier unit 54 through an isolating transformer 56. In this instance, the output terminals of the rectifier units 52 and 54 are connected in series circuit relationship with each other, the terminal 60 of the rectifier 52 being connected through series connected resistors 62 and 64 to the terminal 66 of the rectifier 54, and the terminal 70 of the rectifier 52 being connected through the series connected smoothing reactors 72 and 74 to the terminal 76 of the rectifier 54.

In order to control the magnitude of the voltage across the field winding 34 of the rotary amplifier 28, in accordance with the output voltage of the synchronous condenser 10, one side of the field winding 34 is electrically connected to the junction point of the smoothing reactors 72 and 74 and the other side of the field winding 34 is electrically connected to the junction point of the resistors 62 and 64. Thus, if the output voltage of the synchronous condenser 10 is above the regulated value, current will flow in a predetermined direction through the field winding 34. However, if the output voltage is below the regulated value, current will flow in the opposite direction through the field winding 34.

The minimum excitation system illustrating this invention comprises a sensing network 80 which is responsive to the voltage across the field winding 12 of the synchronous condenser 10, a push-pull magnetic amplifier 82, which is responsive to the output of the sensing network 80, a source of biasing voltage 84 for the sensing network 80 and the magnetic amplifier 82, and a rectifier 86 connected to the output of the magnetic amplifier 82 for preventing the flow of current in one direction from the output of the amplifier 82. It is of course to be understood that a suitable electronic amplifier could be substituted for the magnetic amplifier 82, however, some of the advantages obtained by utilizing a magnetic amplifier in the system would not be obtained by utilizing an electronic amplifier.

In particular, the sensing network 80 comprises a saturable reactor 90 for amplifying the signal received from across the field winding 12 of the synchronous condenser 10 and for polarizing the system. The sensing network 80 also comprises a resistance, capacitance and inductance network 92 for producing at the output of the sensing network 80 a voltage whose curve shape, once it is amplified by the magnetic amplifier 82, is substantially identical to the voltage curve representing the variable voltage across the field winding 34 of the rotary amplifier 28 when the output of the synchronous condenser 10 is above its regulated value. In this instance, the saturable reactor 90 comprises two magnetic core members 94 and 96 which have disposed in inductive relationship therewith control windings 98 and 100, respectively. In order that the current flow through the control windings 98 and 100 is proportional to the magnitude of the voltage across the field winding 12 of the synchronous condenser 10, the control windings 98 and 100 are connected in series circuit relationship with one another and across the field winding 12. As illustrated, a variable resistor 102 is likewise connected in series circuit relationship with the control windings 98 and 100 so that the magnitude of the current flow through the control windings 98 and 100 can be readily varied.

The source of biasing voltage 84 comprises a full wave dry type rectifier 104 which receives energy from a potential transformer 106 which has a primary winding 108 and two secondary winding sections 110 and 112. In particular, the input terminals of the rectifier 104 are electrically connected across the secondary winding section 112 of the transformer 106. However, the output terminals of the rectifier 104 are electrically connected to two biasing windings 116 and 118 which are connected in series circuit relationship with one another and with a variable resistor 119, the windings 116 and 118 being disposed in inductive relationship with the core members 94 and 96, respectively. As can be seen from the drawing, the control winding 98 and the biasing winding 116 are so disposed on the core member 94 that the current flow through them produces a flux in the core member 94 in the same direction. In like manner, the control winding 100 and the biasing winding 118 are so disposed on the core member 96 that the current flow through them produces a flux in the same direction in the core member 96.

In this instance the network 92 comprises a variable resistor 120, an inductance 124, and capacitors 125 and 126. As illustrated, the capacitor 125 and the inductance 124 are connected in parallel circuit relationship with one another, the parallel circuit being connected in series circuit relationship with the capacitor 126. In order to rectify the output current of the sensing network 80, a full wave dry type rectifier 130 is provided. One of the input terminals of the rectifier 130 is electrically connected to one side of the parallel circuit comprising the capacitor 125 and the inductance 124.

In order to apply the voltage appearing across the secondary winding section 110 of the transformer 106 to the combination of the variable resistor 120, the capacitor 126, the parallel circuit comprising the capacitor 125 and the inductance 124, and the rectifier 130, one side of the secondary winding section 110 is electrically connected to the other input terminal of the rectifier 130 and the other side of the winding 110 is electrically connected to one side of the variable resistor 120, the other side of the resistor 120 being connected to the capacitor 126.

In order to vary the voltage at the output terminals of the rectifier 130 and thus the output voltage of the sensing network 80, main windings 134 and 136 of the saturable reactor 90 are disposed in inductive relationship with the core members 94 and 96, respectively. As illustrated, the main windings 134 and 136 are connected in series circuit relationship, one end of the winding 136 being connected to one of the input terminals of the rectifier 130 and one end of the winding 134 being connected to the junction point of the variable resistor 120 and the capacitor 126.

As hereinbefore mentioned, the sensing network 80 produces at its output a voltage which increases in a predetermined manner. However, the shape of the curve representing the manner in which the output voltage of the sensing network 80 increases can be changed by adjusting the variable resistor 120 and also by adjusting a variable resistor 140 which is electrically connected between the sensing network 80 and the magnetic amplifier 82.

The push-pull magnetic amplifier 82 amplifies the output of the sensing network 80 and under one set of conditions as explained hereinafter cooperates with the rectifier 86 to permit current to flow only in one direction from the output of the amplifier 82 and then only when the output from the sensing network 80 has reached a predetermined value. In this instance, the magnetic amplifier 82 comprises a plurality of magnetic core members 144, 146, 148 and 150. In order to vary the saturation of the core members 144, 146, 148 and 150 in accordance with the output voltage of the sensing network 80, a plurality of control windings 152, 154, 156 and 158 are disposed in inductive relationship with the core members 144, 146, 148 and 150, respectively. As illustrated, the control windings 152, 154, 156 and 158 are connected in series circuit relationship with the variable resistor 140, the series circuit being connected across the output terminals of the rectifier 130.

A plurality of main or reactor windings 160, 162, 164 and 166 are likewise disposed in inductive relationship with the core members 144, 146, 148 and 150, respectively. A transformer 170 having a primary winding 172 connected to a suitable alternating current source 174 and secondary winding sections 176 and 178 is provided in order to supply energy to the reactor windings 160, 162, 164 and 166. In order that current flows in only one direction through the reactor windings 160, 162 and through the reactor windings 164 and 166, and in order to obtain a direct current voltage at the output of the magnetic amplifier 82, dry type full wave rectifiers 180 and 182, respectively, are provided. As illustrated, the reactor windings 160 and 162 are connected in series circuit relationship, one end of this series circuit being connected to one end of the secondary winding section 176, the other end of the circuit being connected to one of the input terminals of the rectifier 180. The other input terminal of the rectifier 180 is connected to the other end of the winding section 176. In like manner the reactor windings 164 and 166 are connected in series circuit relationship, one end of this series circuit being connected to one end at the secondary winding section 178, and the other end of the circuit being connected to one of the input terminals of the rectifier 182. The other input terminal of the rectifier 182 is connected to the other end of the winding section 178.

In order to provide both a feedback and a biasing current for the core members, windings 184, 186, 188 and 190 are disposed in inductive relationship with the core members 144, 146, 148 and 150, respectively. The windings 184 and 186 are connected in series circuit relationship, one end of this series circuit being connected to one of the output terminals of the rectifier 180 and the other end of the series circuit being connected to the other output terminal of the rectifier 180 through a portion of a variable resistor 192 and a variable resistor 194. In like manner, the windings 188 and 190 are connected in series circuit relationship with one another, one end of this series circuit being connected to one of the output terminals of the rectifier 182 and the other end being connected to the other output terminal of the rectifier 182 through another portion of the variable resistor 192 and a variable resistor 196.

It is to be noted that the minimum excitation system of this invention can readily be adjusted by means of the variable resistors 192, 194, and 196, that is the output of the amplifier 82 can be readily varied, thus changing the slope of its output curve, and a proper balance of the push-pull magnetic amplifier 82 is also readily obtained.

In this embodiment the current flow through the control winding 152 and through the bias-feedback winding 184 produces a flux in the core member 144 in the same direction. In like manner, the current flow through the control winding 154 and through the bias-feedback winding 186 produces flux in the same direction in the core member 146. However, the current flow through the control winding 156 and through the bias-feedback winding 188 produce fluxes which oppose one another in the core member 148. In like manner, the current flow through the control winding 158 and through the bias-feedback winding 190 produces fluxes which oppose one another in the core member 150.

In order to bias the core members 144, 146, 148 and 150 so that the output from the rectifier 182 is greater than the output from the rectifier 180 when the output voltage of the synchronous condenser 10 is at its regulated value, biasing windings 200, 202, 204 and 206 are properly disposed in inductive relationship with the core members 144, 146, 148, and 150, respectively. In this instance, the biasing windings 200, 202, 204 and 206 are connected in series circuit relationship with one another, one end of the series circuit being connected through a variable resistor 208 to one of the output terminals of the rectifier 104 and the other end of the series circuit being connected through a switch 210 to the other output terminal of the rectifier 104. The purpose of the variable resistor 208 is to provide means for varying the current flow through the biasing windings 200, 202, 204 and 206. The purpose of the switch 210 will be described hereinafter. As can be seen from the drawing, the biasing winding 200 and the bias-feedback winding 184 are so disposed on the core member 144 as to produce fluxes therein that oppose one another. Likewise, the biasing winding 202 and the bias-feedback winding 186 are so disposed on the core member 146 as to produce fluxes therein that oppose one another. On the other hand, the biasing winding 204 and the bias-feedback 188 are so disposed on the core member 148 as to produce fluxes therein that are in the same direction. Likewise, the biasing winding 206 and bias-feedback 190 are disposed on the core member 150 as to produce fluxes therein that are in the same direction.

In order to render the auxiliary winding 32 of the rotary amplifier 28 responsive to the output voltage of the magnetic amplifier 82, one side of the winding 32 is electrically connected to one of the output terminals of the rectifier 182 and the other side of the winding 32 is electrically connected to one of the output terminals of the rectifier 180 through the rectifier 86. A switch 216 is electrically connected across the rectifier 86, the purpose of which will be described hereinafter.

During normal operating conditions, the voltage reference network 38 in conjunction with the rotary amplifier 28 and the main exciter 22 maintains the output voltage of the synchronous condenser 10 substantially constant. However, assuming the output voltage of the synchronous condenser 10 increases to such as value as to tend to drive the excitation voltage across the field winding 12 of the synchronous condenser 10 below a safe operating value, where the synchronous condenser 10 would fall out of step, the sensing network 80 and the magnetic amplifier 82 function to prevent the voltage across the field winding 12 from decreasing below a safe operating point.

Assuming the switch 210 is open and the switch 216 is closed, the apparatus operates as follows. The increased output voltage of the synchronous condenser 10 above the regulated value applied to the voltage reference network 38 effects a decrease in the magnitude of the voltage across the field winding 12. With a decrease in voltage across the field winding 12 the current flow through the control windings 98 and 100 of the saturable reactor 90 decreases to thereby decrease the saturation of the core members 94 and 96, respectively, and thus increase the impedance of the reactor windings 134 and 136, respectively. Such an action decreases the voltage drop across the variable resistor 120 and thereby increases the voltage across the capacitors 125 and 126 and the inductance 124 and thus the voltage across the input terminals of the rectifier 130. This, in turn, increases the output voltage of the rectifier 130 as well as the magnitude of the current flow through the control windings 152, 154, 156, and 158 of the magnetic amplifier 82.

Since the current flow through the control winding 152 and the bias-feedback winding 184 and through the control winding 154 and the bias-feedback winding 186 produce fluxes that are additive in the core members 144 and 146, respectively, the saturation of these core members is increased to thereby increase the current flow through the reactor windings 160 and 162 and thus increase the voltage across the input terminals of the rectifier 180. However, since the current flow through the control winding 156 and through the bias-feedback winding 188 and through the control winding 158 and the bias-feedback winding 190 produce fluxes which oppose one another in the core members 148 and 150, respectively, the saturation of these core members is decreased. This, in turn, increases the impedance of the reactor windings 164 and 166 to thereby decrease the magnitude of the voltage across the input terminals of the rectifier 182 and thus the voltage across its output terminals.

Since the variable resistor 192 is connected between one of the output terminals of the rectifier 180 and one of the output terminals of the rectifier 182 and the series connected variable resistors 194 and 196 are connected between the other output terminals of the rectifiers 180 and 182, there being an electrical connection between the junction point of the resistors 194 and 196 and the mid-section of the resistor 192, current will flow out of one of the output terminals of the rectifier 182 through the auxiliary field winding 32 and the closed switch 216 to one of the output terminals of the rectifier 180. As hereinbefore mentioned, the sensing network 80 in conjunction with the magnetic amplifier 82 produces at the output of the amplifier 82 a voltage that increases in substantially the same manner as the voltage across the field winding 34 of the rotary amplifier 28 increases to thereby prevent the voltage across the field winding 12 of the synchronous condenser 10 from decreasing below a predetermined value.

When the switch 210 is open and the switch 216 is closed, the field excitation voltage across the field winding 12 does not level off immediately to the minimum excitation value, but rather decreases gradually at first, as represented by the first portion of curve A of Fig. 2, to the given minimum excitation value. This gradual decrease at first represented by curve A is caused by the gradual increase at first of the output voltage of the sensing network 80, as represented by curve B, Fig. 3. There is no output from the sensing network 80 and thus from the rectifier 130 until point C, as illustrated in Fig. 3, is reached. Since the minimum excitation level for the synchronous condenser 10 is not reached until the output voltage of the rectifier 130 increases to the point D, there is a period of time between the points C and D in which the regulated voltage of the synchronous condenser 10 is affected.

In order to overcome the above objections, the switch 210 is closed and the switch 216 is open. Under these conditions there is no output current from the magnetic amplifier 82 until the point D on curve B is reached. Thus, the voltage across the field winding 12 of the synchronous condenser 10 decreases to the predetermined minimum excitation value and at that point levels off immediately as represented by the horizontal curve E of Fig. 2, thus preventing the regulated voltage from being affected over the normal range. This action is affected by the bias windings 200, 202, 204 and 206 which, as hereinbefore mentioned, are so disposed on their respective core members as to prevent a current flow out of the rectifier 182 to the auxiliary field winding 32 until the point D on curve B is reached, the rectifier 86 preventing the flow of current in the opposite direction through the auxiliary winding 32.

The apparatus illustrating the teachings of this invention has several advantages. For instance, it employs a biasing scheme which polarizes the unit so that it may respond to both positive and negative minimum excitation voltage settings. Further, by using a push-pull magnetic amplifier whose output is made unidirectional, and then biased so as to have no output until the minimum excitation level is reached, the regulated voltage is not affected by excitation changes over the normal range. The use of the magnetic amplifier also allows the intelligence portion of the circuit to draw a much lower amount of energy from the potential source and it requires a lower level for damping of the circuit. In addition, maintenance costs are low and dependability high, particularly when no electronic tubes are incorporated into the apparatus.

In accordance with the teachings of this invention an absolute minimum excitation value may be set, instead of a minimum value proportional to the rise in alternating-current voltage. With the magnetic amplifier whose gain is adjustable, the system can be set more accurately and with greater ease.

Since certain changes may be made in the above-described apparatus, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a system for preventing a voltage regulator from driving the excitation level of a regulated machine below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being electrically connected to one of the control windings of said amplifier to produce thereacross a voltage which increases in a predetermined manner, a sensing network responsive to the voltage across the field winding of the regulated machine and which produces at its output a voltage which rises in a predetermined manner, and another amplifier responsive to the output of the sensing network, the output of said another amplifier being electrically connected to the other of the control windings of said amplifier, whereby the voltage across said other of the control windings of said amplifier after reaching a predetermined value is equal to the voltage appearing across said one of the control windings of said amplifier and increases in the same predetermined manner as the voltage across said one of the control windings of said amplifier to thereby prevent the voltage across the field winding of the regulated machine from decreasing below the predetermined minimum value.

2. In a system for preventing the field excitation of a regulated machine from going below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being electrically connected to one of the control windings of said amplifier, whereby a voltage is produced across said one of the control windings of said amplifier which increases in a predetermined manner, a sensing network comprising a saturable reactor and an impedance network the saturable reactor being responsive to the voltage across the field winding of the regulated machine and said network being responsive to the output of the saturable reactor to thereby produce at its output a voltage which increases in a predetermined manner, and another amplifier responsive to the output of the sensing network, the output of said another amplifier being electrically connected to the other control winding of said amplifier, whereby the voltage across said other control winding of said amplifier after reaching a predetermined value is equal to the voltage appearing across said one of the control windings of said amplifier and increases in the same predetermined manner as the voltage across said one of the control windings of said amplifier, to thereby prevent the voltage across the field winding of the regulated machine from decreasing below the predetermined minimum value.

3. In a system for preventing a voltage regulator from driving the excitation level of a regulated machine below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being connected to one of the two control windings of said amplifier to produce thereacross a voltage which increases in a predetermined manner, a sensing network responsive to the voltage across the field winding of the regulated machine and comprising a saturable reactor and an impedance network, the saturable reactor comprising a magnetic core member having a control winding disposed in inductive relationship therewith, the current flow through which is proportional to the voltage across the field winding of the regulated machine, a source of biasing voltage, a biasing winding disposed in inductive relationship with the core member and responsive to the output of said source, a main winding disposed in inductive relationship with the core member, a rectifier having input and output terminals, one of the input terminals being connected to one side of the impedance network, an alternating current source of supply connected to the other input terminal of the rectifier and to the other side of said impedance network, circuit means for connecting said main winding to said impedance network and to said other input terminal of the rectifier, whereby the impedance of the main winding varies in accordance with the voltage across the field winding of the regulated machine and the voltage across the output terminals of the rectifier is proportional to the impedance of the main winding, and another amplifier responsive to the voltage across the output terminals of the rectifier, the output of said another amplifier being electrically connected to the other of the two control windings of said amplifier, whereby the voltage across said other of the two control windings of said amplifier after reaching a predetermined value is equal to the voltage appearing across said one of the two control windings of said amplifier and increases in the same predetermined manner as the voltage across said one of the two control windings, to thereby prevent the voltage across the field winding of the regulated machine from decreasing below the predetermined minimum value.

4. In a system for preventing a voltage regulator from driving the excitation level of a regulated machine below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being electrically connected to one of the two control windings of said amplifier to produce thereacross a voltage which increases in a predetermined manner, a sensing network responsive to the voltage across the field winding of the regulated machine and comprising a saturable reactor and a capacitance and inductance network, the saturable reactor comprising a magnetic core member, a control winding disposed in inductive relationship with the core member, the current flow through which is proportional to the voltage appearing across the field winding of the regulated machine, a source of biasing voltage, a biasing winding disposed in inductive relationship with the magnetic core member and responsive to the output of the source of biasing voltage, a rectifier having input and output terminals, one of the input terminals being connected to one side of the capacitor and inductance network, a source of alternating current energy, one side of the source of alternating current energy being connected to the other input terminal of the rectifier, the other side of the alternating current source being connected to the other side of the capacitor and inductance network through an impedance device, a main winding disposed in inductive relationship with the core member, circuit means for connecting one side of the main winding to said other of the input terminals of the rectifier, the other side of the main winding being connected to said other side of the capacitor and inductance network, whereby the impedance of said main winding is proportional to the voltage across the field winding of the regulated machine and the voltage across the output terminals of the rectifier being proportional to the impedance of the main winding, another amplifier responsive to the voltage across the output terminals of the rectifier, the output of said another amplifier being electrically connected to the other of the two control windings of said amplifier, whereby the voltage across said other of the two control windings of said amplifier after reaching a predetermined value is equal to the voltage appearing across said one of the two control windings of said amplifier and increases in the same predetermined manner as the voltage appearing across said one of the two control windings of said amplifier to thereby prevent the voltage across the field winding of the regulated machine from decreasing below the predetermined minimum value.

5. In a system for preventing a voltage regulator from driving the excitation level of a regulated machine below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being electrically connected to one of the two control windings of said amplifier to produce thereacross a voltage which increases in a predetermined manner, a sensing network responsive to the voltage across the field winding of the regulated machine and which produces at its output a voltage which increases in a predetermined manner, another amplifier responsive to the output of the sensing network, circuit means including a rectifier for connecting the output of said another amplifier to the other of the two control windings of said amplifier, said another amplifier being biased so that the rectifier prevents currents from flowing from the output of said another amplifier to said other of the two control windings of said amplifier until the output of the sensing network reaches a predetermined value at which time the polarity of the output of said another amplifier reverses and current flows through said other of the two control windings of said amplifier, whereby the voltage across said other of the two control windings of said amplifier is equal in magnitude to the voltage appearing across said one of the two control windings of said amplifier and increases in the same predetermined manner as the voltage across said one of the two control windings of said amplifier, to thereby prevent the voltage across the field winding of the regulated machine from decreasing below the predetermined minimum value.

6. In a system for preventing a voltage regulator from driving the excitation level of a regulated machine below a safe predetermined minimum value, the combination comprising, a field winding for the regulated machine, an amplifier comprising two control windings and disposed to control the energy supplied to the field winding of the regulated machine, a voltage reference network responsive to the output of the regulated machine, the output of the voltage reference network being electrically connected to one of the two control windings of said amplifier to produce thereacross a voltage which increases in a predetermined manner, a sensing network responsive to the voltage across the field winding of the regulated machine and comprising a saturable reactor and a capacitance and inductance network, the saturable reactor comprising a magnetic core member, a control winding disposed in inductive relationship with the magnetic core member, the current flow through which is proportional to the voltage appearing across the field winding of the regulated machine, a source of biasing voltage, a biasing winding disposed in inductive relationship with the magnetic core member and responsive to the output of said source, a rectifier having input and output terminals, one of the input terminals being connected to one side of the capacitor and inductance network, a source of alternating current energy, one side of the source of alternating current energy being connected to the other input terminal of the rectifier, the other side of the alternating current source being connected to the other side of the capacitor and inductance network through an impedance device, a main winding disposed in inductive relationship with the magnetic core member, circuit means for connecting one side of the main winding to said other of the input terminals of the rectifier, the other side of the main winding being connected to said other side of the capacitor and inductance network, whereby the impedance of said main winding is proportional to the voltage across the field winding of the regulated machine and the voltage across the output terminals of the rectifier being proportional to the impedance of the main winding, a push-pull magnetic amplifier responsive to the voltage across the output terminals of the rectifier, circuit means including another rectifier for connecting the output of the push-pull magnetic amplifier to the other of the two control windings of said amplifier, the push-pull magnetic amplifier being biased so that said another rectifier prevents the flow of current to said other of the two control windings until the voltage across said rectifier reaches a predetermined value at which time the polarity of the output voltage of the push-pull magnetic amplifier reverses and current flows to said other of the two control windings, whereby the voltage appearing across said other of the two control windings increases in the same predetermined manner as the voltage across said one of the control windings of said amplifier, to thereby prevent the voltage across the field winding of the regulated machine from decreasing below the predetermined minimum value.

SCHUYLER L. BRADLEY.
NEIL NICHOLS.

References Cited in the file of this patent
UNITED STATES PATENTS

| Number | Name | Date |
|---|---|---|
| 2,459,640 | Griscom et al. | Jan. 18, 1949 |
| 2,608,679 | Witzke | Aug. 26, 1952 |